Oct. 2, 1962  L. BEREGOWITZ  3,056,332
PHOTOELECTRICALLY CONTROLLED SWITCHING CIRCUIT
Filed March 18, 1960

INVENTOR
LOUIS BEREGOWITZ
BY J. B. Burke
ATTORNEY.

3,056,332
PHOTOELECTRICALLY CONTROLLED SWITCHING CIRCUIT
Louis Beregowitz, 1841 E. 19th St., Brooklyn, N.Y.
Filed Mar. 18, 1960, Ser. No. 15,862
6 Claims. (Cl. 88—24)

This invention relates to an automatic exposure control timer for a photographic printer, and more particularly concerns a photoelectric timing circuit for effecting control of a photographic printer.

A first object of the invention is to provide an exposure control timer which is responsive substantially linearly to a range of light wavelengths of at least 3000 to 7000 angstroms.

Another object is to provide an adjustable timer for circuit control.

A further object is to provide a photoelectrically controlled timer which is responsive linearly to light values covering the range of at least .001 to 100 foot candles.

The ranges indicated above are greater than are generally considered attainable in photoelectric timing devices.

The invention is further directed at providing a compensating circuit including an "equivalent resistance" to adapt a photoelectric timer employing a photoconductive element responsive to a non-linear function, so as to respond linearly to varying intensities of incident light. The present invention employs a highly sensitive photoconductive cell as the photoresponsive element in place of photoemissive cells heretofore used. As a result amplifier circuits required in conventional timing circuits are avoided and the greater ranges of light response and time control indicated above are attainable.

In the usual procedure of printing pictures by photographic means, a negative is placed in an enlarger or printer underneath a light source and an image is projected through a lens having an aperture controlled by a diaphragm on to a sensitized piece of photographic printing paper. The length of time that the light of the printer is left on should be inversely proportional to the amount of light illuminating the printing paper. This amount of light is determined by the density of the negative, the distance of the light from the printing paper, the opening of the lens diaphragm of the printer or enlarger, and the speed of the printing paper. When the printing paper is of the variable contrast type, prints having various grades of contrast are possible of attainment with any one paper by employing different types of light filters between the printer or enlarger light source and the printing paper. Since each filter may have a different color and each has its own light transmission characteristics, this introduces another variable into the procedure to render it more complex, making end results unpredictable and uniform results difficult of attainment.

The present invention eliminates the uncertainty in the end results due to variables above mentioned by providing a circuit in which those variables have no effect. This is accomplished by picking up reflected light from the face of a printing paper when the enlarger light source is turned on. The light is integrated optically in a light sensory unit and transformed electrically to determine a time limit during which the light source is turned on. This time limit is proportional inversely to the amount of light being projected upon the paper by the light source. The device embodying the invention also compensates for various types of filters and diffusers used with the variable contrast printing paper by altering the color response of the light sensory unit employing a photoconductive element or cell.

The invention will be better understood from the following more detailed description taken together with the drawing, wherein.

Figure 1:
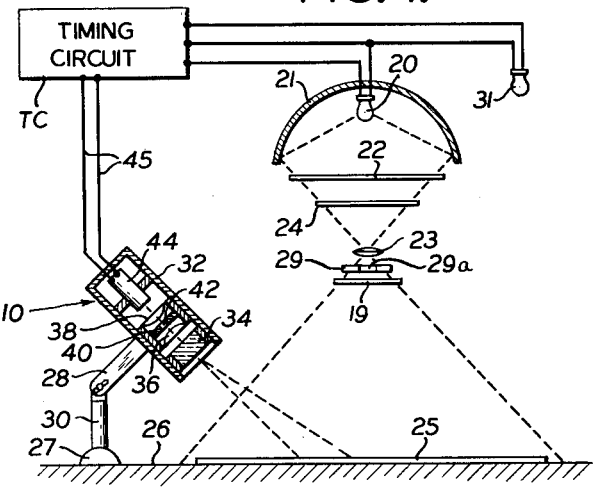
FIG. 1 is an elevational view partially sectional and somewhat diagrammatic in character illustrating a photographic enlarger and in association therewith a light responsive device embodying the invention.

The enlarging apparatus illustrated in FIG. 1 comprises a projection lamp 20, a reflector 21, a light-diffusing screen 22 and a projection lens 23. A diaphragm 29 having an adjustable opening 29a is disposed adjacent to lens 23. The photographic negative 24 to be enlarged is supported in a suitable support between the screen 22 and the lens 23 so that an enlarged image will be projected onto the surface of a sheet of sensitized printing paper 25 on an appropriate support 26. The printing paper may be of variable contrast type. A contrast control screen 19 may be located between the lens 23 and printing paper 25. A safelight lamp 31 is provided to illuminate the working area when the light 20 is turned off. The parts described or their equivalents are common to conventional photographic enlargers and printers and may be varied without departing from the present invention.

The light responsive device included in the present invention employs a sensory light pickup cell 10 which may be mounted on an arm 28 adjustably carried on a post 30 secured to a stand 27. The cell 10 includes a housing 32 having an open end in which is mounted a colored light filter 34. Behind the filter is a lens system including lenses 36 and 38 and a diaphragm 40 having an aperture 42. Optically aligned with the lens system, aperture and filter is a photoelectric cell 44. This cell is a photosensitive device containing a photoconductive element such as a cadmium selenide crystal or the like which changes internal electrical resistance when illuminated. The cell is connected by wires 45 to a timing circuit TC. Lamps 20 and 31 are also connected to the timing circuit for control thereby. The timing circuit is shown in detail in FIG. 2.

The projected image on the printing paper 25 reflects light to the photoconductive cell 44 via the optical assembly including lenses 36, 38, diaphragm 40 and filter 34. The diaphragm 40 controls the amount of light reaching the photoconductive element. Filter 34 which passes certain predetermined light wavelengths compensates for the particular type of variable contrast paper 25 used in printing photographically by varying the response resistance-wise of the light sensory unit to any particular light wavelength.

The photoconductive element 44 is a passive circuit element. The terms "photoconductive element" and "photoconductive cell" are used rigorously in this specification and exclude such active circuit elements as photoemissive and photoelectric tubes and cells which develop a voltage or current at their terminals when subjected to light.

Figure 2:
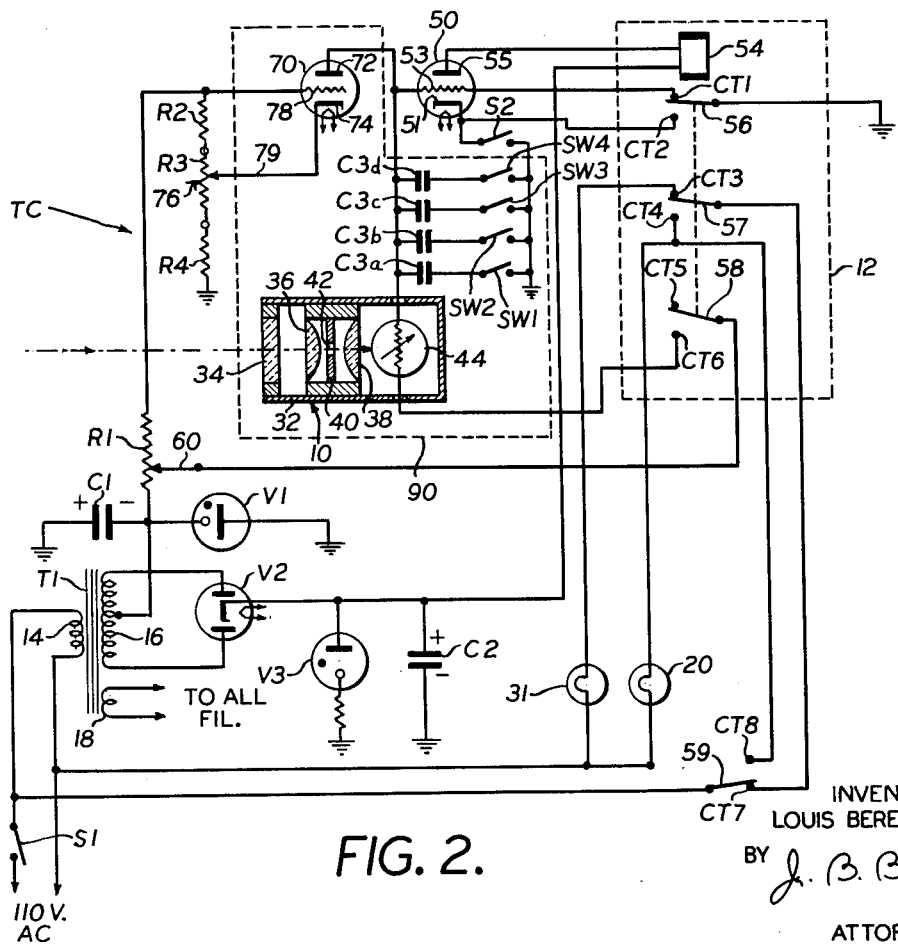
FIG. 2 is a diagrammatic view illustrating the timing circuit and associated essential components of the enlarger.

The photoconductive cell 44 is used in the timing circuit which will now be described to control a switching circuit for turning off the lamp 20 in the enlarger and turning on the lamp 31. Referring to FIG. 2, transformer T1 has a primary winding 14 and secondary windings 16 and 18. Primary winding 14 is connected to an A.C. power source via a switch S1. A full wave rectifier tube V2 is connected to the secondary winding 16 which is center tapped. Secondary winding 18 is connected to filaments of tubes in the circuit. Capacitor C1 is in parallel with voltage regulator tube V1 and capacitor C2 is in parallel with voltage regulator tube V3 to provide a regulated D.C. power supply for the timing circuit. Triode 50 is employed as a holding means for relay 12. The triode is normally cut off since its cathode circuit is normally open. The cathode 51 is connected to the normally open contact CT2 of relay 12. The relay 12 includes a coil 54, three movable ganged poles 56–58 and three pairs of contacts CT1, 2; CT3, 4; and CT5, 6. Contacts CT1, 3 and 5 are normally closed with poles 56–58. Contacts CT2, 4 and 6 are normally open. Coil 54 is in series with plate 55 of tube 50. Switch 59 has contacts CT7, CT8 connected to contacts CT3, CT4 respectively.

Photoconductive cell 44 is connected in a resistance-capacitance circuit 90 including any one of a plurality of capacitors C3a–d in parallel with the resistance of cell 44. The capacitors are in series with respective normally open switches SW1–SW4 any one of which can be closed to connect its associated capacitor into circuit 90. The capacitors have different capacitances so that different time constants can be obtained selectively for circuit 90, by closing any selected one of the switches SW1–SW4. A switch S2 connected between cathode 51 and circuit 90 is shown open.

Safelight lamp 31 is connected to the A.C. power supply via contact CT3, pole 57 and switch 59. Lamp 20 is connected to the A.C. power supply via contact CT4, pole 57 and switch 59 when the relay is energized. Tap 60 of variable resistor R1 is connected to pole 58.

A tube 70 has its plate 72 connected to the grid 53 of tube 50. Cathode 74 of tube 70 is connected to tap 79 of variable resistor R3 which is one of a group 76 of three resistors R2, R3, R4 connected in series in the circuit of grid 78. Fixed resistor R2 is connected between resistor R3 and grid 78. Resistor R4 is connected between resistor R3 and ground. The photoconductive cell 44 has one terminal connected to normally open contact CT6. Tube 70 serves as an "equivalent resistance" to compensate for non-linearity of response of the cell 44 as will be explained below.

In operation of the circuit, switch S1 will be closed to energize the power supply. Safelight lamp 31 will be turned on. One of switches SW1–4 will be closed which places one of capacitors C3a–d in circuit 90 and determines the time range of the circuit. Switch S2 will then be closed to start a timing cycle for the lighting of lamp 20. The cathode return circuit of tube 50 will be closed through switch S2 and tube 50 will start to draw a heavy plate current since it is zero biased at this instant, so that relay coil 54 becomes energized. Poles 56–58 all move to close with contacts CT2, 4, 6 respectively. Lamp 20 turns on and safelight lamp 31 turns off.

When the lamp 20 turns on, the electrical resistance of cell 44 varies according to the amount of light reflected to the cell from printing paper 25 through filter 34, lenses 36 and 38 and aperture 42 of diaphragm 40. At the instant the lamp 20 is turned on a negative voltage starts to build up across one of the selected capacitors C3a–C3d with which cell 44 is in series as part of circuit 90. The time rate at which this negative voltage builds up is determined by the supply voltage at the tap 60 of resistor R1, the instantaneous resistance of cell 44 (which is governed by the amount of light reflected from the printing paper 25) and the capacitance of the selected capacitor C3a–C3d. Since the voltage rise across the selected capacitor C3a–C3d is logarithmic and the resistance change of cell 44 is not linear with respect to linear changes in light intensity, it would at first appear impossible to achieve a time base which is inversely proportional to changes in light intensity. It would also appear impossible to properly compensate for non-linearity of response of the photoconductive cell since this cell has a very high resistance at the very low illumination levels at which the light sensory unit 10 is normally operated. In the present invention, however, this necessary compensation for non-linearity of response is accomplished in a novel manner. This is done by providing tube 70 as an "equivalent resistance" across the photoconductive cell 44. With this tube in parallel with the cell 44 and with a very low potential applied to the cathode 74 of tube 70, the plate current through the tube is varied by varying resistor R3 in the grid-cathode circuit to obtain complementary current and voltages necessary to compensate for the non-linearity of cell 44 in conjunction with capacitor C3a, b, c or d.

Figure 3:
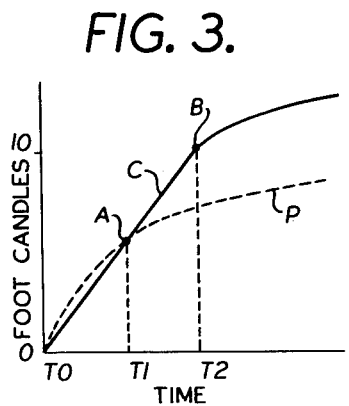
FIG. 3 is a graphic diagram illustrating operational characteristics of the invention.

FIG. 3 illustrates graphically how linearity of response is accomplished. Curve P represents the non-linear response characteristic of the photoconductive cell 44 with light intensity in foot candles plotted against time for any intensity of illumination of the cell. The representative range of 0–10 foot candles is employed for this curve. At the low or short time end of the curve from time T0 to T1, the resultant curve C is rendered substantially linear up to point A by the proper adjustment of resistor R1. With compensation due to the effect of the compensating circuit R3 and 70 (the "equivalent resistance") the long time portion T1–T2 of curve C from point A to point B is rendered substantially linear. The overall length of the timing cycle is controlled by the appropriate selection of capacitors C3a–C3d, and by adjustment of aperture 42 in diaphragm 40 of the light sensory unit. Any desired number of capacitors of different capacitance values may be provided for this purpose in the circuit.

When the negative voltage at the selected capacitor C3a–C3d and at the grid 53 of tube 50 reaches a predetermined critical negative magnitude, the plate current of tube 50 becomes too low to hold relay 12 in energized condition. Relay coil 54 becomes substantially deenergized which causes the poles 56–58 to move to their normally closed positions with contacts CT1, 3, 5. This completes the cycle as the lamp 20 is turned off.

Switch 59 is provided for manual operation to turn lamps 20 or 31 on selectively when required.

The color response of a conventional photoconductive cell containing a cadmium selenide or equivalent photosensitive crystal ranges normally from below 4000 angstrom units to over 9000 angstrom units, thus covering substantially the entire visible light range. It is necessary to compensate properly over this range for different variable contrast printing papers. This is accomplished by filter 34 whose color is selected according to the particular type of paper used. The filter 34 thus acts as a light valve to limit the range of response of the photoconductive cell to predetermined light wavelengths selected by the filter in order to increase resistance of the cell to certain wavelengths and to decrease the resistance to other wavelengths.

The invention has thus provided means for employing a photoconductive cell in a timing device to control a switching circuit in order to obtain the manifold advantages of greater sensitivity at low light levels than are generally obtainable with other types of photoelectric cells. The invention has further provided means to compensate for non-linearity of response of a photoconductive cell in a resistance-capacitance circuit.

The timing circuit described is relatively simple and inexpensive to construct. Use of amplifiers and other complicated and expensive mechanical and electrical devices are avoided. While the invention has been explained with particular reference to control of a lamp in a printing enlarger, the invention is applicable to control of switching means in other devices.

What is claimed and sought to be protected by Letters Patent is:

1. A photoelectrically controlled switching circuit, comprising relay means, first vacuum tube means connected to said relay means for energizing and deenergizing said relay means to actuate the same, a resistance-capacitance circuit connected to said vacuum tube means to limit the time said relay means is energized, a photoconductive element in circuit with said resistance-capacitance circuit to vary the resistance thereof, said element having an internal resistance variable non-linearly with linear variations in light impinging thereon, and second vacuum tube means in circuit with said element, said second vacuum tube means having an equivalent internal resistance complementary to the variable resistance of said element to compensate for the non-linearity in variations of internal resistance of said element to render said variations effectively linear.

2. A photoelectrically controlled switching circuit according to claim 1, wherein the compensation for non-linearity of response of said photoconductive element by said second vacuum tube means is effective over a limited range of time, and a variable resistor in circuit with said element for rendering said response effectively linear for a time shorter than said limited range of time.

3. A photoelectrically controlled switching circuit, comprising relay means, a first vacuum tube means in circuit with said relay means for energizing and deenergizing said relay means to control actuation thereof, a resistance-capacitance circuit connected to said vacuum tube means to limit the time said relay means is energized, a photoconductive element in circuit with said resistance-capacitance circuit to vary the resistance thereof, said element having an internal resistance variable non-linearly with linear variations in light impinging thereon, and a second vacuum tube means in circuit with said element, said second vacuum tube means having an equivalent variable internal resistance complementary to the variable resistance of said element to compensate for the non-linearity in variations of internal resistance of said element to render said variations effectively linear, said second vacuum tube means having a plate circuit connected to said photoconductive element.

4. A photoelectrically controlled switching circuit according to claim 3, wherein said resistance-capacitance circuit includes a resistor, a plurality of capacitors connected in series with said resistor, and a plurality of switches respectively in circuit with said capacitors for selectively placing one of said capacitors in circuit with said resistor in the resistance-capacitance circuit, whereby the time limited by the resistance-capacitance circuit is selectively varied.

5. A photoelectrically controlled switching circuit, comprising relay means, first vacuum tube means in circuit with said relay means for energizing and deenergizing said relay means to control actuation thereof, a resistance-capacitance circuit connected to said vacuum tube means to limit the time said relay means is energized, a photoconductive element in circuit with said resistance-capacitance circuit to vary the resistance thereof, said element having an internal resistance variable non-linearly with linear variations in light impinging thereon, second vacuum tube means in circuit with said element providing an equivalent resistance to compensate for non-linearity in variations of internal resistance of the photoconductive element to render said variations effectively linear, and a lamp in circuit with said relay means to be lighted when said relay means is energized and to be extinguished when said relay means is deenergized.

6. A photoelectrically controlled switching circuit, comprising a load device, relay means in circuit with said load device for actuating the same, first vacuum tube means connected to said relay means for energizing and deenergizing said relay means, a resistance-capacitance circuit connected to said vacuum tube means for determining a time limit for energizing said relay means, a photoconductive element being in circuit with the resistance-capacitance circuit, said element having an internal resistance variable non-linearly with variations in intensity of light impinging thereon, and second vacuum tube means in circuit with said element and first vacuum tube means and providing an equivalent variable resistance complementary to the variable resistance of said element to compensate for the non-linear variations in resistance of said element to render said variations linear.

References Cited in the file of this patent

UNITED STATES PATENTS

| | | |
|---|---|---|
| 2,037,925 | Rentschler | Apr. 21, 1936 |
| 2,232,373 | Dorst | Feb. 18, 1941 |
| 2,484,299 | Labrum | Oct. 11, 1949 |
| 2,668,474 | Rogers | Feb. 9, 1954 |
| 2,912,593 | Deuth | Nov. 10, 1959 |
| 2,944,190 | Ost | July 5, 1960 |
| 2,947,232 | Armentrout et al. | Aug. 2, 1960 |